United States Patent [19]
Kurobe

[11] Patent Number: 5,592,623
[45] Date of Patent: Jan. 7, 1997

[54] SYSTEM FOR A DISTRIBUTED WIRELESS STAR NETWORK WITH TERMINAL DEVICES AND A CONCENTRATOR INCLUDING START BITS AND ORING LOGIC FOR RESOLVING TRANSMISSION CONTENTION

[75] Inventor: Akio Kurobe, Moriguchi, Japan

[73] Assignee: Matsushita Electric Industrial Co., Ltd., Osaka, Japan

[21] Appl. No.: 54,164

[22] Filed: Apr. 26, 1993

[30] Foreign Application Priority Data

Apr. 28, 1992 [JP] Japan .................... 4-109963

[51] Int. Cl.$^6$ .......................... G06F 13/00; G06F 15/16
[52] U.S. Cl. .................... 395/200.06; 395/200.11; 395/860; 364/229; 364/229.5; 364/230.5; 364/242.94
[58] Field of Search ............... 370/85; 395/200, 395/325; 364/200

[56] References Cited

U.S. PATENT DOCUMENTS

| | | | |
|---|---|---|---|
| 4,516,239 | 5/1985 | Maxemchuk | 370/85 |
| 4,670,871 | 6/1987 | Vaidya | 370/94 |
| 4,740,956 | 4/1988 | Hailpern et al. | 370/85 |
| 4,797,879 | 1/1989 | Habbab et al. | 370/89 |
| 4,894,819 | 1/1990 | Kondo et al. | 370/94.3 |
| 4,970,722 | 11/1990 | Preschutti | 370/94.3 |
| 5,276,703 | 1/1994 | Budin et al. | 370/85.2 |

FOREIGN PATENT DOCUMENTS

| | | | |
|---|---|---|---|
| 0187503 | 7/1986 | European Pat. Off. | H04L 11/16 |
| 8810538 | 6/1988 | WIPO . | |

OTHER PUBLICATIONS

"Packet Reservation Multiple Access for Local Wireless Communications", D. J. Goodman et al., IEEE Vehicular Technology Conference, No. 38, Jun. 1988, pp. 701–706.

Primary Examiner—Thomas C. Lee
Assistant Examiner—Marc K. Weinstein
Attorney, Agent, or Firm—Price, Gess & Ubell

[57] ABSTRACT

Disclosed is a decentralized data-processing star network with a contention system having a plurality of terminal devices and a concentrator to interconnect the terminal devices via a transmission medium. Any of the terminal devices can start to transmit a packet immediately after a pause disposed to prohibit all transmissions, the pause occurring every time a packet has been transmitted. The concentrator has a start bit generation device for generating a start bit in accordance with the timing that the terminal devices should transmit their start bits and a relay device for ORing the generated start bit with each bit of a packet modulated as predetermined with a first frequency, converting it into a packet modulated as predetermined with a second frequency, and sending it out. Each of the terminal devices is assigned a unique code for contention control and has a monitor device for ORing bits of the code sent from the concentrator with corresponding bits of a code to be transmitted, and monitoring the accordance between bits of the OR and corresponding bits of the code to be transmitted in order to suspend the transmission if they do not accord. The bit configuration of the unique code is either all logical 0s, one logical 1 in the first bit, or more than one logical 1 contiguously from the first bit.

21 Claims, 9 Drawing Sheets

FIG. 7(a) start bit transmission unit
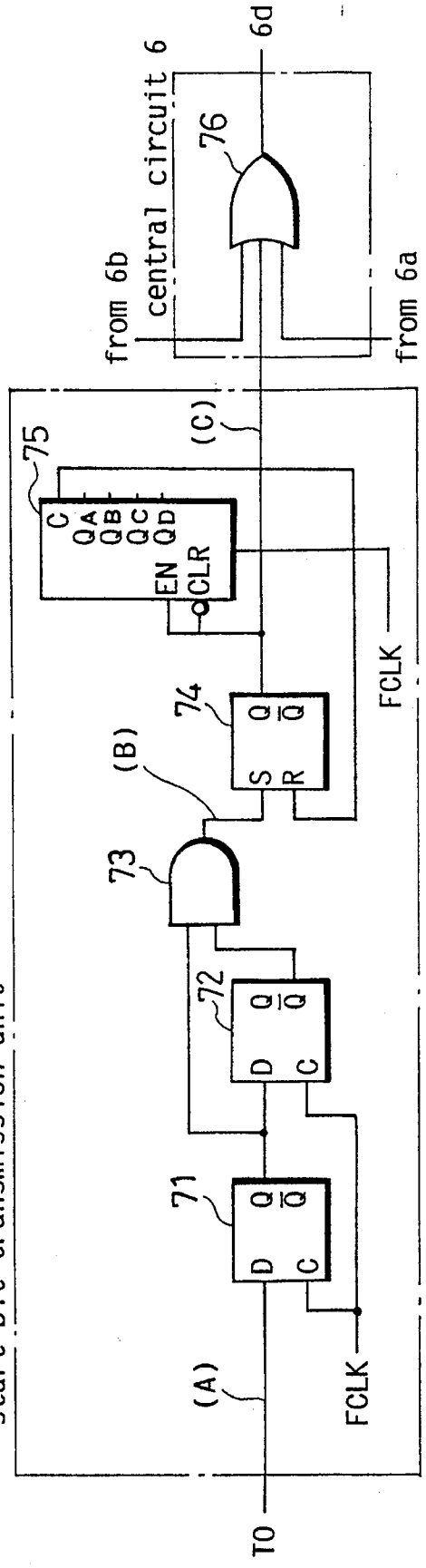
FIG. 7(b)
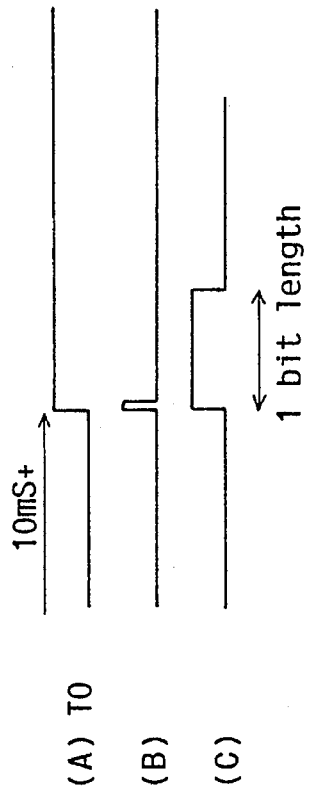

FIG. 10
　　　　ST　b0　b1　b2　b3　b4　b5　b6　b7　P　STP
(a) 
(b) 
(c) 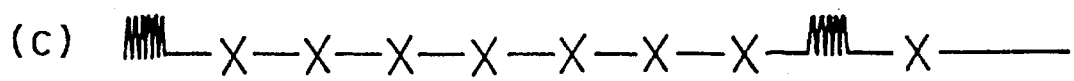
(d) 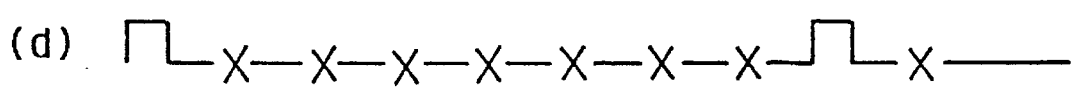
(e) 

SYSTEM FOR A DISTRIBUTED WIRELESS STAR NETWORK WITH TERMINAL DEVICES AND A CONCENTRATOR INCLUDING START BITS AND ORING LOGIC FOR RESOLVING TRANSMISSION CONTENTION

BACKGROUND OF THE INVENTION (1) Field of the Invention

This invention relates to applying a media access based on carrier sense multiple access/collision detection (hereinafter referred to as CSMA/CD), which is generally used in a bus network, to a star network.

(2) Description of the Related Art

Home Bus System (HBS) is one of the systems employing a survival media access based on CSMA/CD.

FIG. 1(a)/(b)/(c) respectively depict a frame configuration, a character code configuration, and how each frame is transmitted in such a system.

As shown in FIG. 1(a), one frame consists of blocks of character codes, namely, a PRiority code (PR), a Source Address (SA), a Destination Address (DA), a Control Code (CC), a Byte Count (BC), DATA, an Error Check Code(ECC), a DuMmY code (DMY), and ACKnowledge/Not AcKnowledge (ACK/NAK). The first two codes, PR and SA have a function as a bit string to determine a survival in contention control. DATA is variable in length up to a maximum of 256 characters, the other codes having fixed lengths.

As shown in FIG. 1(b), one character code consists of an 8-bit data unit, start and stop bits for start-stop transmission, and a parity bit for error detection.

As shown in FIG. 1(c), continually monitoring a signal on the bus, each terminal device counts a pause of 10 mS every time the last transmission of a packet from any terminal device including itself is completed, and then starts the transmission of its own packet, if any. The pause includes a synchronous recovery monitoring period corresponding to the last 2 bits of the entire length thereof. If any terminal device starts to transmit a packet within this period due to its pause-counting error, the others can follow without waiting for the end of the pause. Thus, each terminal device can fairly use the bus.

FIG. 2 explains how terminal device 1 wins in the competition and continues the transmission when terminal devices 1 and 2 have tried to access at the same instant. FIG. 2(a) shows PR and SA of a packet sent from terminal device 1, while FIG. 2(b) shows the same sent from terminal device 2, both PRs being identical. Their waveforms are respectively shown in FIG. 2 (c)/(d). FIG. 2(e) depicts the waveform of the signal on a bus which is the result of the codes sent from each terminal device being wired-ORed.

When terminal devices 1 and 2 are in contention, the waveform of PR of a signal on the bus coincides with the codes of both terminal devices 1 and 2. On the other hand, the waveform of SA of the signal on the bus becomes logical 1 as the result of logical 1 from terminal device 1 and logical 0 from terminal device 2 being wired-ORed.

Monitoring the waveform of a signal on the bus per bit, terminal device 2 suspends transmission as soon as it detects discordance between its own code (logical 0) and the waveform (logical 1) of the signal on the bus as shown in FIG. 2. Terminal device 1, on the other hand, continues the transmission to the end without noticing the collision. Since the codes in SAs on the terminal devices are all different from each other, any one of the terminal devices can surely transmit a packet.

Such HBS used in a bus network has been expected to be applied to a distributed data-processing star network by utilizing infrared radiation as its transmission media.

In some systems using infrared radiation for transmitting control signals such as remote control signals or information signals such as voices, images, and data, allocation of sub-carrier frequency has been proposed to avoid cross-interference between signal channels ("Sub-carrier frequency allocation for infrared data transmission" EIAJ CP-1205) and ("Infrared Applications" IEC TC84/WG17).

FIG. 3 shows an example of channel allocation of sub carriers. Channel 1 is allocated a frequency band for existing remote control, Channel 2 is allocated another frequency band for convention system and analog voice transmission, whose use is considered difficult in Japan because of the affects of luminaire with high frequency lighting. Channel 3, 4 and 5 are respectively allocated frequency bands for data transmission, for hi-fi voice transmission, and image transmission.

However, a survival media access based on CSMA/CD of a bus network has been unable to be applied to a star network. For example, a data signal being transmitted through channel 3 must be first modulated with a sub-carrier having a sine wave between 1 and 2 MHz; however, in the survival media access based on CSMA/CD, the modulated signal may collide at any phase, causing phase distortion or reverse phase. In other words, detected logical levels may become indefinite or garbled, which may hinder proper contention control or proper detection of a start bit for start-stop transmission.

SUMMARY OF THE INVENTION

In view of the foregoing problems, the object of this invention is to provide a distributed data-processing star network which can operate a survival media access based on CSMA/CD, and further to provide a concentrator and terminal devices used therein.

The above object can be achieved by a decentralized data-processing star network with a contention system comprising a plurality of terminal devices and a concentrator to inter-connect the terminal devices via a transmission medium. Any of the terminal devices can start to transmit a packet immediately after a pause disposed to prohibit all transmissions, the pause occurring every time a packet has been transmitted. The concentrator comprises a start bit generation device for generating a start bit in accordance with the timing that the terminal devices should transmit their start bits, and a relay device for ORing the generated start bit with each bit of a packet modulated as predetermined with a first frequency, converting it into a packet modulated as predetermined with a second frequency, and sending it out. Each of the terminal devices is assigned a unique code for contention control and comprises a monitor device for ORing bits of the code sent from the concentrator with corresponding bits of a code to be transmitted, and monitoring the accordance between bits of the OR and corresponding bits of the code to be transmitted in order to suspend the transmission if they do not accord.

The above object can be achieved also by a decentralized data-processing star network with a contention system, comprising a plurality of terminal devices and a concentrator to interconnect the terminal devices via a transmission medium. Any of the terminal devices can start to transmit a packet immediately after a pause disposed to prohibit all transmissions, the pause occurring every time a packet has been transmitted. The concentrator comprising: a reception device for demodulating a packet modulated as predetermined with a first frequency, the packet being transmitted from the terminal devices via an upstream transmission medium; a start bit generation device for counting the pause based on the demodulated packet and outputting a start bit for start-stop transmission, in accordance with the timing that the terminal devices should transmit their start bits; an OR device for ORing predetermined bits of the packet sent from the reception device with a start bit sent from the start bit generation device, and outputting it; and a transmission device for modulating the output of the OR device as predetermined with a second frequency different from the first frequency and transmitting it to each terminal device via a downstream transmission medium. Each of the terminal devices is assigned a unique code for contention control and comprises a transmission/reception device for modulating a packet to be transmitted as predetermined, with the first frequency, transmitting it to the concentrator via an upstream transmission medium, and demodulating a packet received from the concentrator via a downstream transmission medium into a packet, the packet having been modulated by the second frequency; a packet OR device for ORing each bit of a packet to be transmitted with a corresponding bit of the packet demodulated by the transmission/reception device when the packet is transmitted; and a communication process device for monitoring the accordance between the output of the packet OR device and the packet to be transmitted in order to suspend the transmission if they do not accord.

The transmission medium may be infrared radiation and the reception device may have a plurality of reception ports to receive a packet from each terminal devices, each of the reception ports comprising an optical-electric converter for converting infrared radiation into an electric signal and a demodulator to demodulate the packet outputted from the optical-electric converter.

The transmission medium may be infrared radiation and the transmission device may have a plurality of transmission ports to transmit packets to each terminal device, each of the transmission ports comprising a modulator to amplitude shift-keying (hereinafter referred to as ASK) modulate a packet to be transmitted according to each bit thereof and an electric-optical converter for converting electric signals into infrared radiation.

The start bit generation device may comprise a timing detection unit for detecting a start bit in the packet demodulated by the reception device; a timer unit for outputting a timeout signal by counting the pause, the timer unit is retriggerbly activated by the detection of the start bit; and a start bit transmission unit for outputting a start bit at the point of the timer unit outputting the timeout signal.

The transmission medium may be infrared radiation and the transmission/reception device may have an optical-electric converter for converting infrared radiation into an electric signal, a demodulator to demodulate the packet outputted from the optical-electric converter, a modulator to ASK modulate the packet to be transmitted according to each bit thereof, and an electric-optical converter for converting an electric signal into infrared radiation.

The above object can be achieved by a concentrator interconnecting a plurality of terminal devices via a transmission medium in a decentralized data-processing star network, wherein any of the terminal devices can start to transmit a packet immediately after a pause disposed to prohibit all transmissions, the pause occurring every time a packet has been transmitted. The concentrator comprising a reception device for demodulating a packet modulated as predetermined with a first frequency, the packet being transmitted from the terminal devices via an upstream transmission medium; a start bit generation device for outputting a start bit for start-stop transmission, in accordance with the timing that the terminal devices should transmit their start bits, based on the demodulated packet; an OR device for ORing predetermined bits of the packet sent from the reception device with a start bit sent from the start bit generation device, and outputting it; and a transmission device for modulating the output of the OR device as predetermined with a second frequency different from the first frequency and transmitting it to each terminal device via a downstream transmission medium.

The transmission medium may be either infrared radiation or radio wave.

The above object can be achieved by a plurality of terminal devices intercommunicated by a concentrator so as to form a decentralized data-processing star network, each being assigned a unique code for contention control and able to start to transmit a packet immediately after a pause disposed to prohibit all transmissions, the pause occurring every time a packet has been transmitted. The terminal devices comprise a transmission/reception device for modulating a packet to be transmitted as predetermined, with the first frequency, transmitting it to the concentrator via an upstream transmission medium, and demodulating a packet received from the concentrator via a downstream transmission medium, the packet having been modulated by the second frequency; a packet OR device for ORing each bit of a packet to be transmitted with a corresponding bit of the packet demodulated by the transmission/reception device when the packet is transmitted; and a communication process device for monitoring the accordance between the output of the packet OR device and the packet to be transmitted in order to suspend the transmission if they do not accord.

The predetermined modulation may be ASK modulation.

The bit configuration of the unique code may be either all logical 0s, one logical 1 in the first bit, or more than one logical 1 contiguously from the first bit.

The bit configuration of the unique code may be either all logical 0s or one logical 1 in any one bit only.

According to the distributed data-processing star network having the above-mentioned construction, even if an ASK modulated signal constituting a packet sent from the terminal devices suffer from reverse phase or phase distortion due to cross-interference among the terminal devices, the relay device in the concentrator first ORs of each signal received from the terminal devices, and then ORs it with a start bit generated by the start bit generation device, so that a start bit with a definite logical level can be sent back to the terminal devices.

In the same manner, a monitor device in each terminal device ORs a signal of its own sending with a signal received from the concentrator, so that it can receive a signal with a definite logical level. As a result, detection failure of a start bit can be eliminated. In addition, each terminal device is allocated a unique code for contention control to avoid cross-interference, so that each terminal device can suspend transmission if the signal from the concentrator does not accord with the code for contention control of its own sending.

Thus, monitoring a signal from the concentrator by each terminal device can enable the survival media access based on CSMA/CD, which is conventionally used in a bus network, to apply to a star network with infrared radiation or radio waves instead of cables.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7 (a) is a sample circuit of the start bit transmission unit in Embodiment 1. FIG. 7(b) is time charts of (a).

FIG. 10 shows waveforms of each circuit shown in FIG. 9.

DESCRIPTION OF THE PREFERRED EMBODIMENTS

<Embodiment 1>

Figure 4:
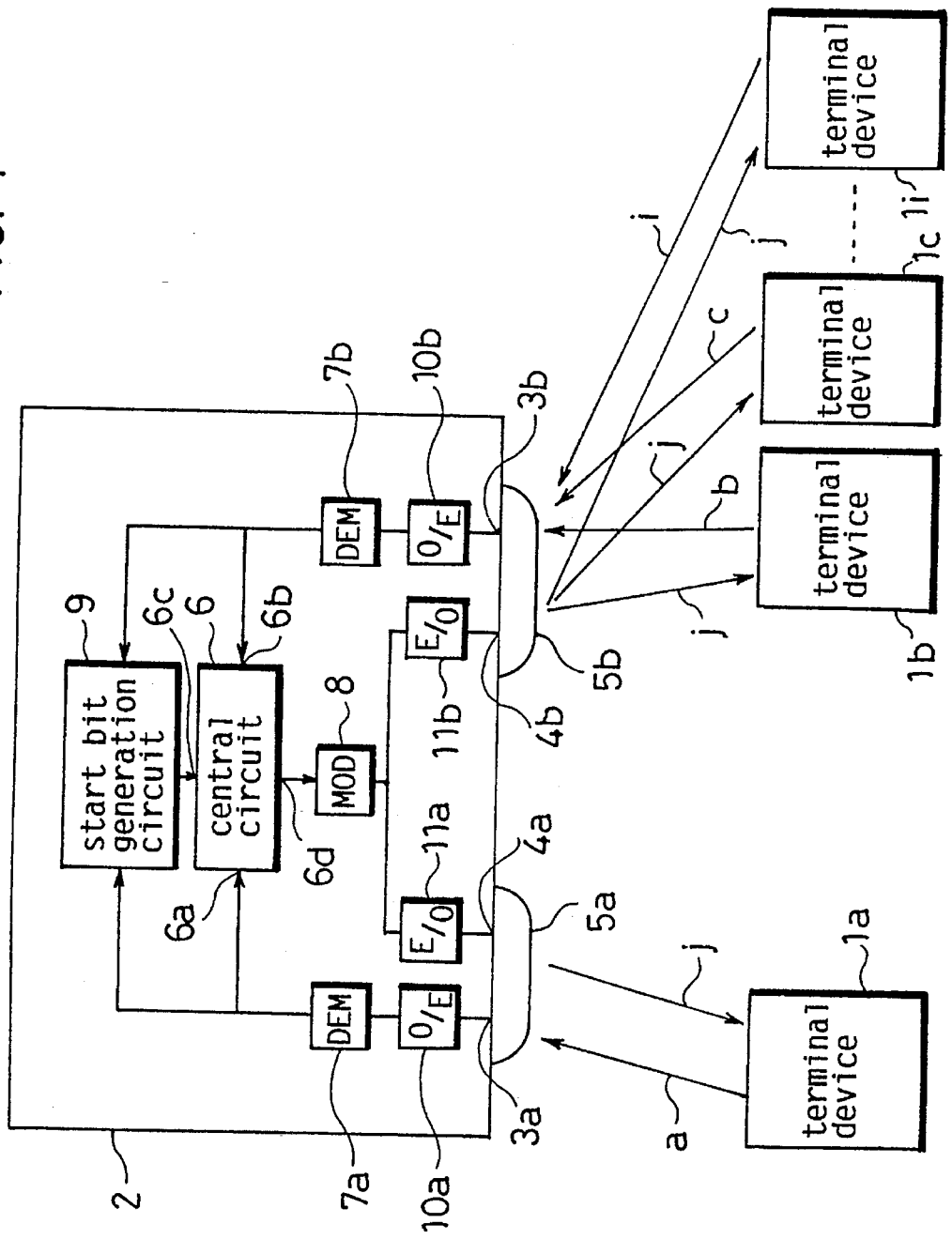
FIG. 4 shows the construction of distributed data-processing star network in Embodiment 1 of this invention.

As shown in FIG. 4, the star network of this embodiment consists of terminal devices 1a-1i and a concentrator 2. The concentrator 2 has input terminals 3a/3b and output terminals 4a/4b both as part of signal transmission-reception ports 5a/5b, a central circuit 6 having input ports 6a/6b/6c and an output port 6d, signal reception circuits 7a/7b, a signal transmission circuit 8, a start bit generation circuit 9, light reception elements 10a/10b, and light emission elements 11a/11b.

Figure 3:
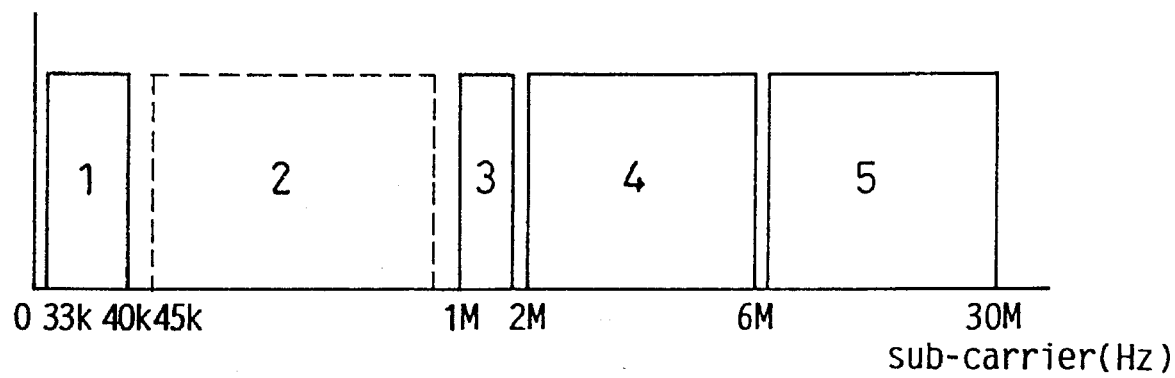
FIG. 3 shows the allocation of sub-carrier channels in a light space transmission system.

These terminal devices 1a-1i are intercommunicated by the concentrator 2 with a frequency band of channel 3 allocated for data transmission as shown in FIG. 3. The maximum number of such terminal devices is larger than the number of bits in PR by 1, and priority order among these terminal devices for media access is determined by the bits of PR. These nine terminal devices 1a-1i are respectively assigned 9 different data units in the PRs. One of these data units is outputted with no carrier at all, another is outputted with one carrier in the first bit, the others respectively are outputted with two or more carriers continuous from the first bit.

The central circuit 6 outputs the logical OR of signals inputted to its input ports 6a, 6b, and 6c to its output port 6d.

The signal reception circuits 7a and 7b demodulate signals ASK-modulated by a carrier having frequency f1 sent from the light reception elements 10a and 10b, and then output return-to-zero (hereinafter referred to as RZ) signals.

The signal transmission circuit 8 ASK-modulates RZ signals sent from the central circuit 6 with a carrier having frequency f2.

The start bit generation circuit 9 provides a start bit for start-stop transmission to the input port 6c of the central circuit 6 in accordance with the timing that each terminal device 1a-1i can transmit a packet.

The light reception elements 10a/10b convert infrared signals sent from the terminal devices 1a-1i via the signal transmission-reception ports 5a/5b into electric signals.

The light emission elements 11a/11b convert electric signals sent from the transmission circuit 8 into infrared signals and then transmit them to the terminal devices 1a-1i via the signal transmission-reception ports 5a/5b.

Figure 5:
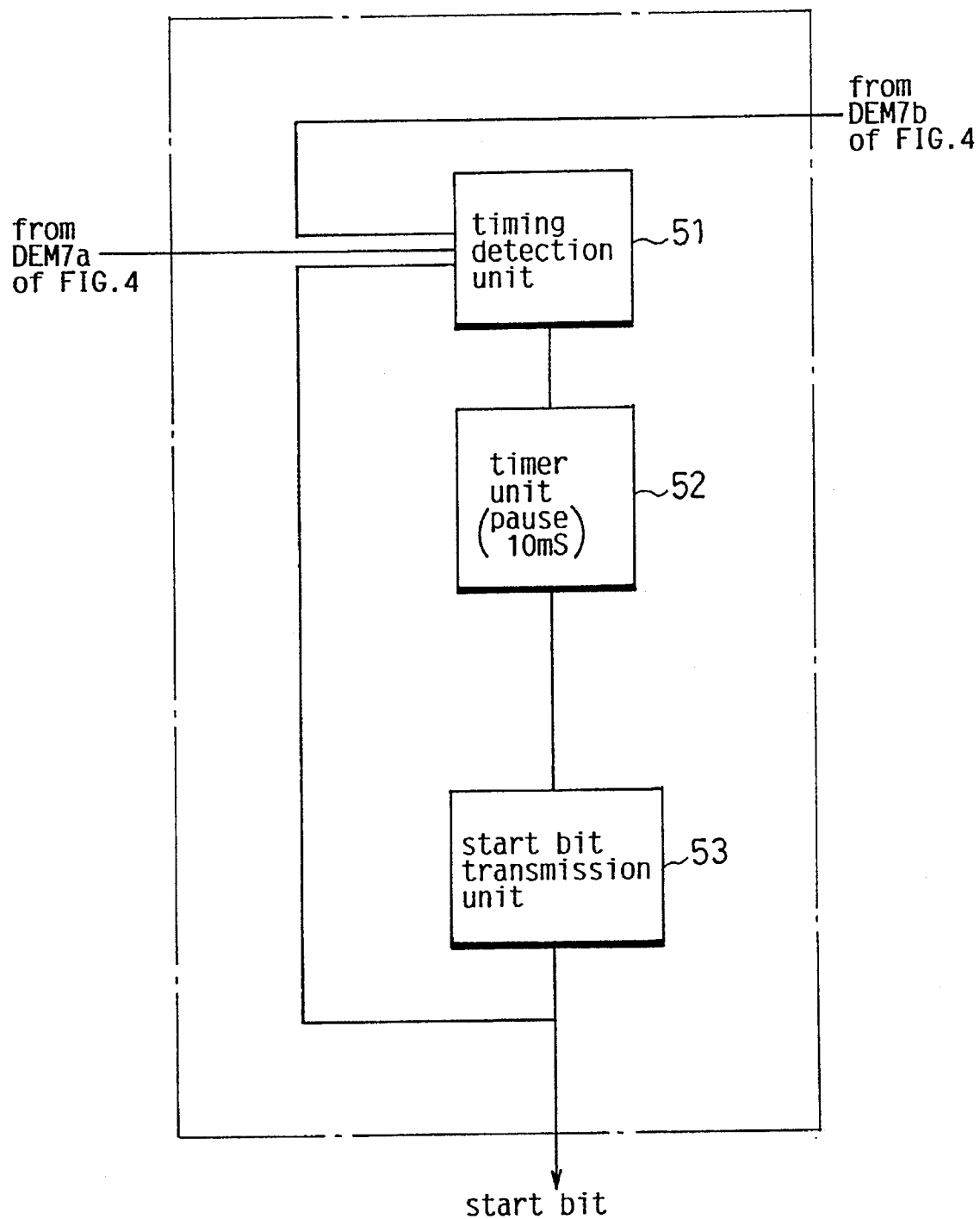
FIG. 5 shows a block diagram of the start bit generation circuit in Embodiment 1 of this invention.

The start bit generation circuit 9 shown in FIG. 5 consists of a timing detection unit 51, a timer unit 52, and a start bit transmission unit 53.

The timing detection unit 51 detects the timing of packets transmitted/received among the terminal devices 1a-1i and then activates the timer unit 52.

Figure 1A:
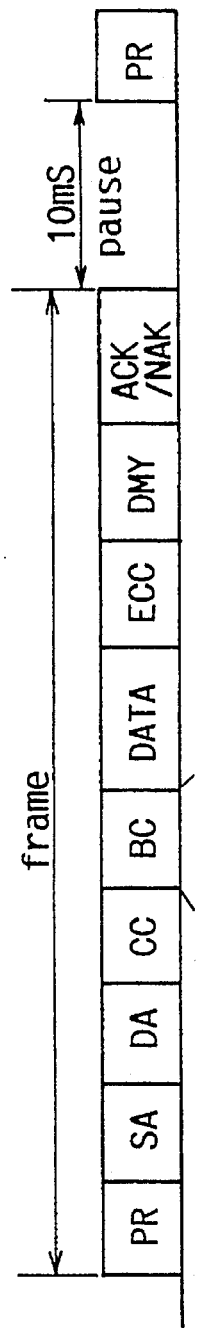
FIG. 1 (a) shows a frame configuration used in HBS.
FIG. 1(b) shows a character code configuration used in HBS.
FIG. 1(c) shows how each frame is transmitted in HBS.
Figure 1B:
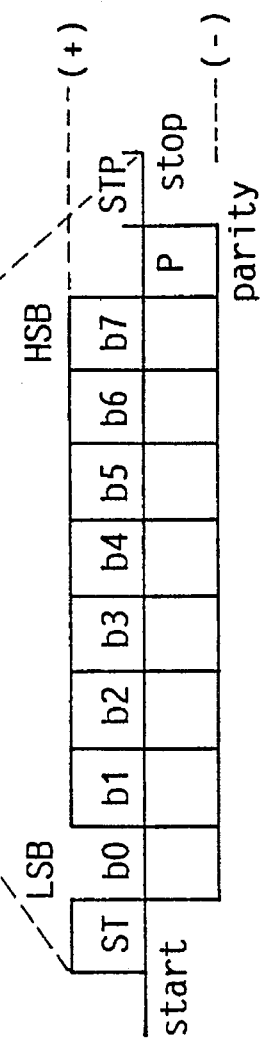
Figure 1C:
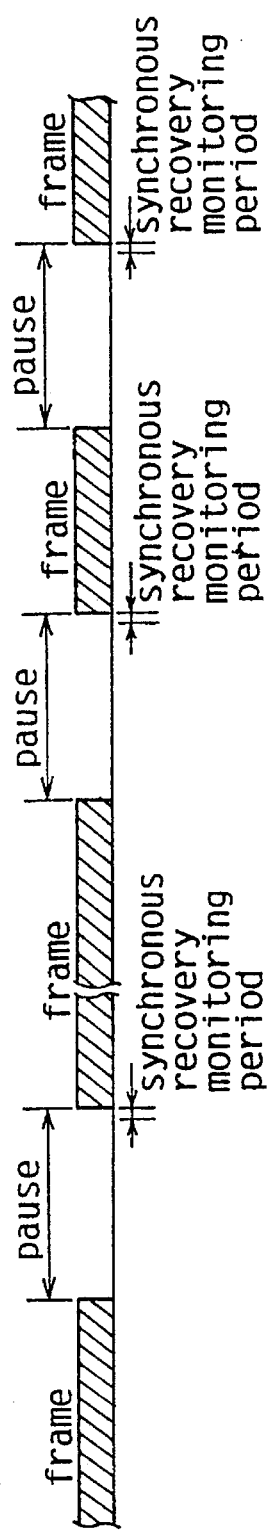
Figure 2:
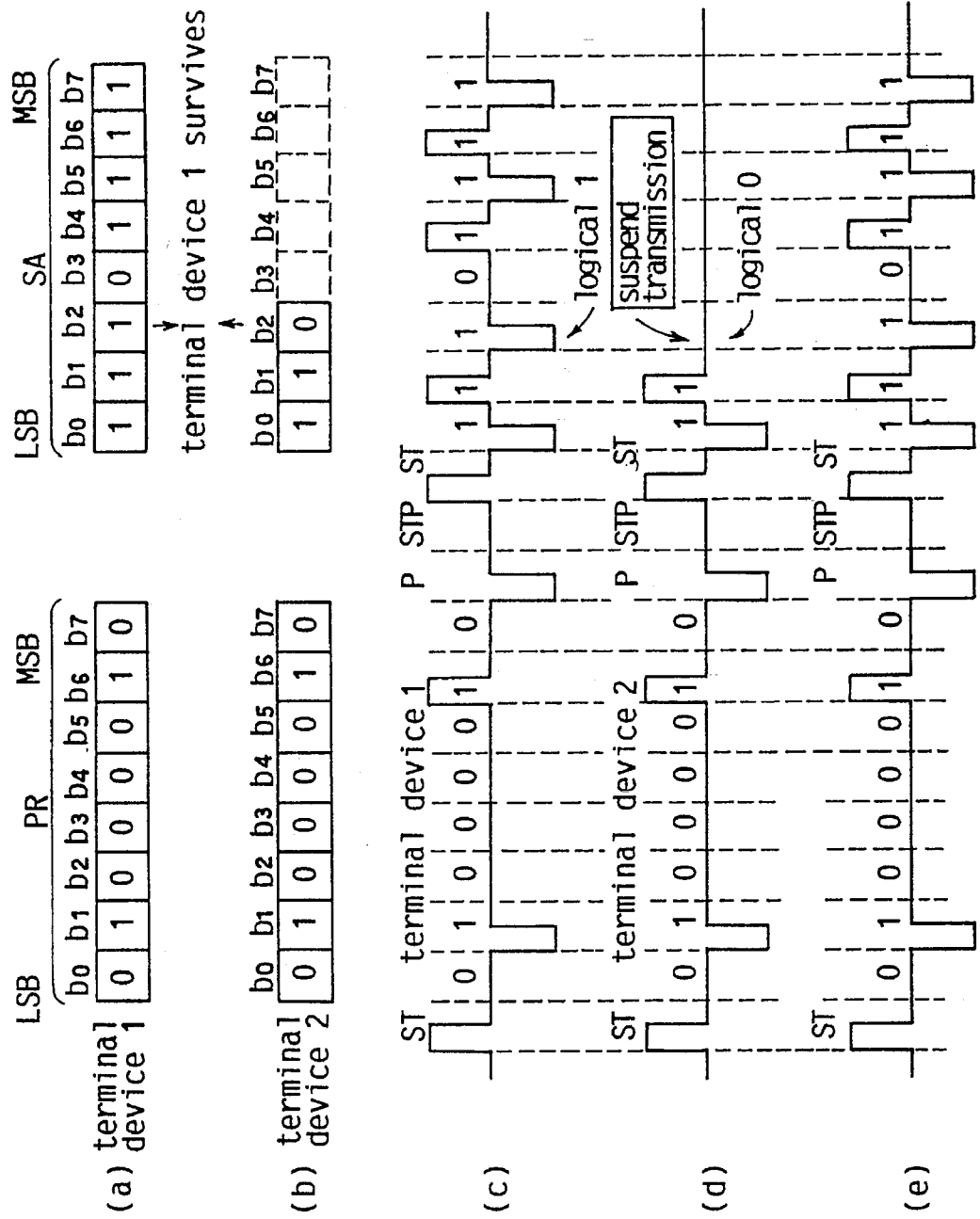
FIG. 2 explains the rules of contention control in HBS.

The timer unit 52 counts a pause of 10 mS shown in FIG. 1 (c) immediately after a packet transmission by any terminal device is completed.

The start bit transmission unit 53 transmits a start bit at the end of the pause.

Figure 6A:
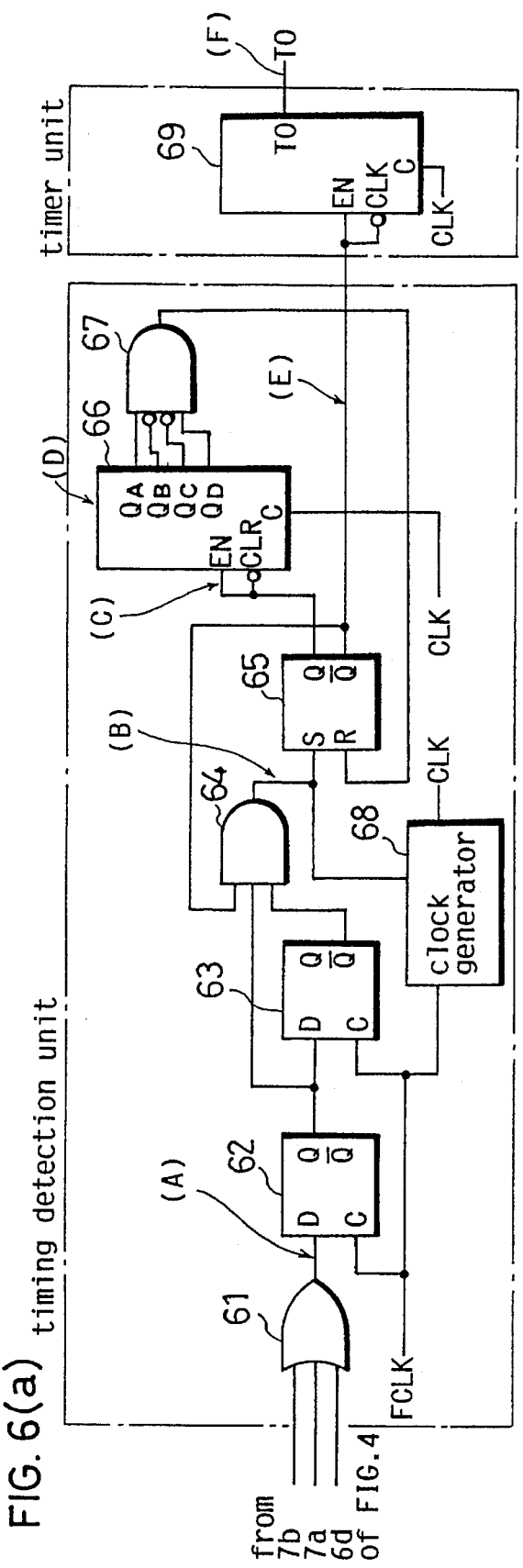
FIG. 6 (a) is a sample circuit of the timing detection unit and the timer unit in Embodiment 1.
FIG. 6(b) is time charts of (a).

In FIG. 6(a) showing an example of a circuit of the timing detection unit 51 and the timer unit 52, the timer detection unit 51 is composed of an OR circuit 61, D-flip flops 62 and 63, an AND circuit 64, a RS-flip flop 65, a counter 66, another AND circuit 67, and a clock generator 68, while the timer unit 52 being composed of a timer 69 only. In the drawing, CLK and FCLK respectively represent a clock signal whose cycle is a 1-bit length and a clock signal whose frequency is 16 times as high as that of CLK.

The OR circuit 61 ORs a signal sent from the signal reception circuits 7a and 7b with a start bit sent from the start bit transmission unit 53.

The D-flip flop 62 latches the output of the OR circuit 61 with FCLK.

The D-flip flop 63 latches the Q output of the D-flip flop 62 with FCLK.

The AND circuit 64 ANDs the Q output of the D-flip flop 62, the *Q output (hereinafter *Q means logical NOT of Q) of the D-flip flop 63, and the *Q output of the RS-flip flop 65.

The RS-flip flop 65 is set by the output of the AND circuit 64 and reset by the output of the AND circuit 67.

The counter 66 is a 4-bit binary counter which counts with CLK, and controlled its operation by the Q output of the RS-flip flop 65.

The AND circuit 67 outputs a logical 1 when the count value of the counter 66 has become 9.

The clock generator 68 outputs CLK whose frequency is 16 times as low as FCLK by synchronizing it with a start bit detection signal outputted from the AND circuit 64.

The timer 69 of the timer unit 52 is controlled by the Q output of the RS-flip flop 65 and outputs a timeout signal after counting a pause of 10 mS (to be more accurate, a time period of 10 mS+1 bit length).

In FIG. 7 (a) showing an example of a circuit of the start bit transmission unit 53 shown in FIG. 5 and the central circuit 6 shown in FIG. 4, the start bit transmission unit 53 is composed of D-flip flops 71 and 72, an AND circuit 73, a RS-flip flop 74, and a counter 75.

The D-flip flop 71 latches the output of the timeout signal of the timer 69 with FCLK.

The D-flip flop 72 latches the Q output of the D-flip flop 71 with FCLK.

The AND circuit 73 ANDs the Q output of the D-flip flop 71 and the *Q output of the D-flip flop 72.

The RS-flip flop 74 is set by the output of the AND circuit 73 and reset by the C (Carry out) output of the counter 75, the Q output outputting a 1-bit length pulse as a start bit.

The counter 75 is a 4-bit binary counter which counts with FCLK, and controlled its operation by the Q output of the RS-flip flop 65.

The OR circuit 76 in the central circuit 6 ORs a start bit sent from the RS-flip flop 74 with a signal sent from the reception circuits 7a and 7b.

The operation of the star network of this embodiment having the above-mentioned construction is described as follows:

Each terminal device transmits a packet, like the transmission timing shown in FIG. 1 (c), at the point that a pause of 10 mS has passed after the completion of the transmission of a packet.

It is assumed that the terminal devices 1a-1i and the concentrator 2 are positioned as shown in FIG. 4, infrared signals sent from terminal device 1a has reached the transmission-reception port 5a, and infrared signals sent from the terminal devices 1b-1i have reached the transmission-reception port 5b. The terminal devices 1a has no carrier in the data unit (b0–b7) of its PR. Terminal device 1b has a carrier in b0 only. Terminal device 1c has carriers in b0 and b1. In the same manner, the terminal devices 1d-1h have carriers respectively in b0–b2, b0–b3, b0–b4, b0–b5, and b0–b6. Terminal device 1i has carriers in all of b0–b7.

The infrared signal "a" emitted from terminal device 1a as shown in FIG. 8(a) is inputted to the light reception element 10a via the transmission-reception port 5a, and converted into an electric signal. The electric signal is demodulated by the reception circuit 7a and sent as a signal shown in FIG. 8(e) to the input port 6a of the central circuit 6. Infrared signals "b through i" shown in FIG. 8(b)–(d) sent from the terminal devices 1b-1i are all collected to the transmission-reception port 5b in the concentrator 2, so that ST and b0–b6 are garbled as shown in FIG. 8(f) due to the collision of carries having different phases, and only b7 transmitted from terminal device 1i is fixed to high level. The "X" marks in the drawing represent being indefinite.

Figure 6B:
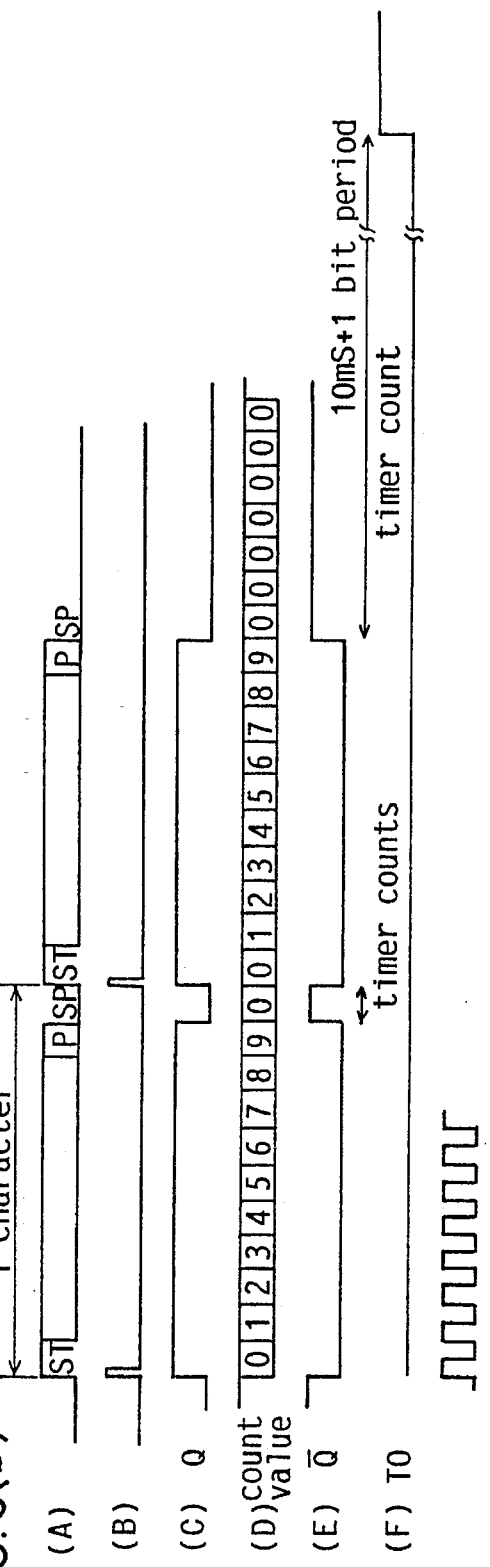

On the other hand, the start bit generation circuit 9 generates a start bit in accordance with the transmitting timing of each terminal device as follows:

Signals sent from each terminal device are inputted to the start bit generation circuit 9 via the light reception elements 10a/10b and the reception circuits 7a/7b. In the timing detection unit 51 shown in FIG. 6(a), signals of the reception circuits 7a/7b are ORed with a start bit of the output port 6d by the OR circuit 61 (FIG. 6 (b)-(A)). The D-flip flops 62 and 63 and the AND circuit 64 detect a rising edge of a start bit by the output of the OR circuit 61 (FIG. 6 (b)-(B)). Then, the Q and *Q outputs of the RS-flip flop 65 output a pulse having 9-bit length starting from the start bit by the RS flip flop 65, the counter 66, and the AND circuit 67 (FIG. 6 (b)-(C) and (E)). The *Q output of the RS-flip flop 65 controls the timer 69 in the timer unit 52 to be retriggerble, that is, the value of the timer 69 is cleared when the *Q output of the RS-flip flop 65 is in low level, while the timer 65 starts to count from 0 when it goes to high level.

The timer 69 starts timer operation and outputs a timeout signal (TO in FIG. 6(a)) when the pause ends. Then, a start bit is sent by the start bit transmission unit 53 in FIG. 7 (a) as follows. A rising edge of a timeout signal is detected by the D-flip flops 71 and 72 and the AND circuit 73 (FIG. 7 (b)-(B)). Then, A 1-bit length pulse is sent out from the Q output of the RS-flip flop 74 as a start bit by the RS-flip flop 74 and the counter 75.

Figure 8:
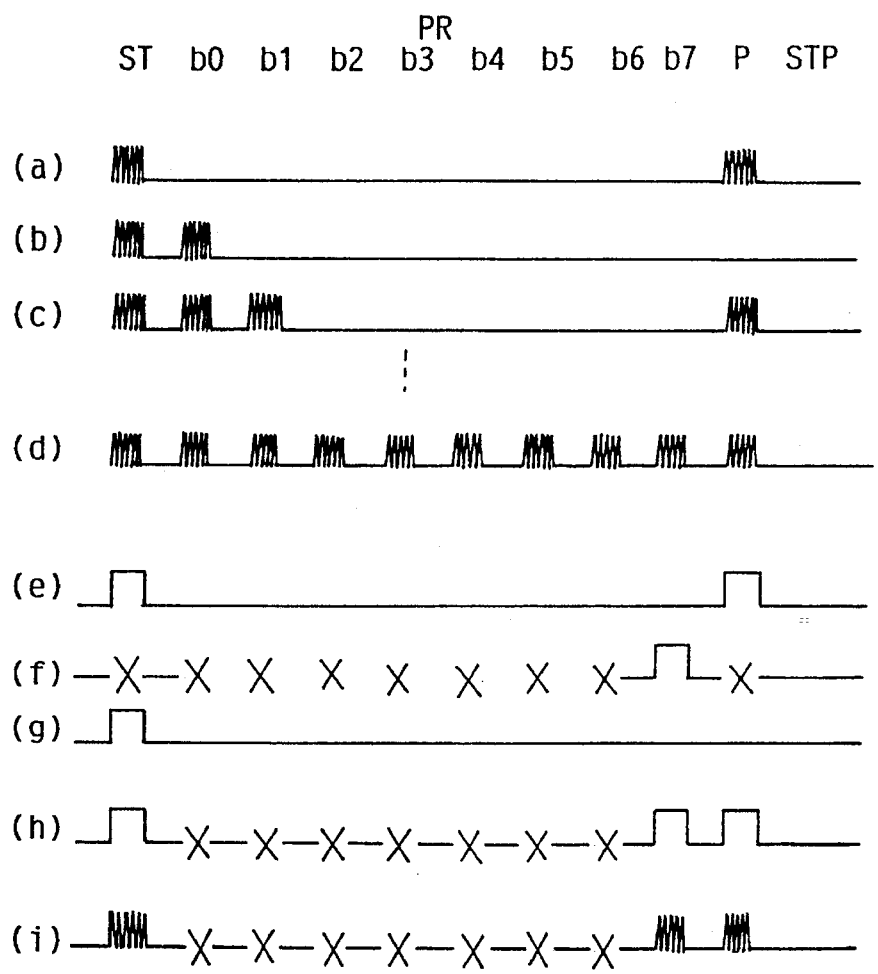
FIG. 8 shows waveforms of each circuit shown in FIG. 4.

The start bit outputted from the start bit generation circuit 9 is provided to the input port "c" of the central circuit 6 as shown in FIG. 8 (g).

The central circuit 6 ORs signals inputted to its input ports 6a–6c, and outputs a signal shown in FIG. 8(h) to the output port 6d. Thus outputted signal is ASK-modulated by the transmission circuit 8, converted into an infrared signal by the light emission elements 11a and 11b, and then sent to all the terminal devices 1a-1i as a signal "j", shown in FIG. 8(i) from the transmission-reception ports 5a and 5b.

Comparing a transmitted signal with a received signal per bit, any terminal device received a carrier when it did not send a carrier itself, suspends the transmission, considering the carrier as another's. Even if the undefined part of the signal "j" become all low level, the terminal devices 1a-1h suspend the transmission because of the carrier in b7 of the received signal "j" in spite of having sent no carrier in b7. As a result, terminal device 1i successfully transmits. In the case that any of the undefined part become high level, the terminal devices having sent no carrier to the bit result in suspending the transmission earlier. In the case that terminal device 1i does not transmit, all the terminal devices 1a-1g except 1h suspend the transmission, terminal device 1h exclusively transmits a packet.

In the case that terminal device 1a does not transmit, the ST is indefinite in the input port 6a of the central circuit 6, and if the input port 6c is in low level, the output port 6d becomes indefinite or garbled. When the start bit is fixed in low level, the other terminals can not perform start-stop transmission. Therefore, the start bit generation circuit 9 supplies a start bit to the input port 6c of the central circuit 6 in the timing that all the terminal devices 1a-1i transmit packets, thereby the start bit is definitely fixed in high level.

The parity bit (P) is added to transmit an odd number of pulse. However, the number of pulses depends on the level of the indefinite part of the signal "j", thus easily causing conflict of the parity bits. Therefore, in such a case, the parity check for PR should be avoided in the terminal devices 1a-1i.

Thus, the last 1 bit in PR of a terminal device which transmitted the longest consecutive carrier never collides with others, the other terminal devices which received this signal recognizing that they lost in competition and suspend their transmissions. Since a start bit whose level became indefinite owing to the collision of the upstream signal can be compensated by the concentrator 2, the terminal devices can perform start-stop transmission without any problems. Furthermore, the use of infrared signals as a transmission medium can realize to form a network accommodating a number of terminal devices by using two frequencies, for example, a carrier of a frequency f1 for upstream signals "a through i" and another carrier of a frequency f2 for downstream signal "j".

Although infrared signals are used as a transmission medium to avoid using cable in this embodiment, radio wave may be used for the same purpose.

<Embodiment 2>

Figure 9:
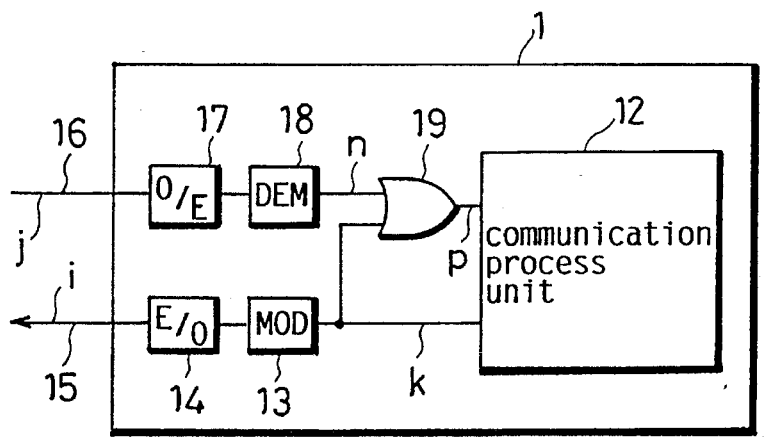
FIG. 9 shows the construction of a terminal device used in the star network in Embodiment 2 of this invention.

As shown in FIG. 9, the terminal device used for the star network of this embodiment consists of a communication process unit 12, a transmission circuit 13, light emission unit 14, an upstream transmission medium 15, a downstream transmission medium 16, a light reception unit 17, a reception circuit 18, and an OR circuit 19.

The communication process unit 12 controls communication.

The transmission circuit 13 ASK-modulates a serial data to be transmitted from the communication process unit 12 into a signal so that the logical 1 of the serial data becomes a sine wave having a frequency f1.

The light emission unit 14 converts electric signals sent from the transmission circuit 13 into infrared signals.

The light reception unit 17 converts infrared signals into electric signals.

The reception circuit 18 demodulates serial data sent from the light reception unit 17.

The OR circuit 19 provides the OR of the output data sent from the communication process unit 12 and the output data sent from the reception circuit unit 18 to the reception data port in the communication process unit 12.

The concentrator 2 is constructed the same as the one in the star network shown in FIG. 4, and all the terminal devices 1a-1i have the construction shown in FIG. 9.

The following is the operation of the terminal device of this embodiment having the above-mentioned construction.

When terminal device 1i shown in FIG. 4 is used for description, the data in PR transmitted by the communication process unit 12 is a signal shown in FIG. 10(a), and a signal "i" as shown in FIG. 10(b) is outputted to the concentrator after ASK-modulated by the transmission circuit 13. On the other hand, when the other terminal devices also transmit like in Embodiment 1, signal "j" shown in FIG. 10(c) is sent back. The b0–b6 of the signal "j" could be indefinite level or garbled.

Generally, according to the conventional algorithm of CSMA/CD, any terminal device that has transmitted a logical 1 inevitably receives a logical 1, without affecting the contention control. Some systems employ another algorithm according to which if a terminal device that has transmitted a logical 1 receives a logical 0, it is regarded as an error in the transmission-reception circuit or in a transmission path and the transmission is suspended.

Assume this algorithm is applied to this invention, and if the communication process unit 12 received an indefinite signal "n" shown in FIG. 9 whose waveform is shown in FIG. 10(d), the signal, if it has fallen into a low level, would be regarded as an error of a transmission path and then the transmission would be suspended.

However, according to this invention, signals that the communication process unit 12 receives are like a signal "p" shown in FIG. 10(e), which is the OR of the signal "n" and the signal "k", so that a terminal device that has transmitted a logical 1 inevitably receives a logical 1. Thus, this invention does not suffer from any inconvenience by employing the algorithm. In addition, a terminal device which transmitted a logical 0 receives a logical 1 when another terminal device has transmitted a logical 1 as b7 in FIG. 10. In this case, the communication process unit 12 of the terminal device which transmitted a logical 0 suspends the transmission according to the algorithm of survival CSMA/CD because the received result does not accord with the transmitted signal.

Thus, the OR circuit 19, when a carrier transmitted by a terminal device has fallen into being indefinite due to collision with another carrier, pretends to have transmitted the carrier to the communication process unit 12 by ORing a received signal with the transmitted signal. On the other hand, the communication process unit 12 which has not transmitted a carrier itself recognizes that it has received a carrier. Hence, survival contention control can be applied to the terminal devices even their carriers are indefinite due to cross-interference.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A decentralized data-processing star network with a contention system, comprising a plurality of terminal devices and a concentrator to interconnect the terminal devices via a wireless transmission medium, any of the terminal devices being able to start to transmit a packet immediately after a pause disposed to prohibit all transmissions, the pause occurring every time a packet has been transmitted, wherein the concentrator comprises:

start bit generation means for generating a start bit in accordance with the timing that the terminal devices should transmit their start bits; and relay means for ORing the start bit generated by the start bit generation means with the start bits of packets which have been modulated as predetermined with a first frequency and received from the plurality of terminal devices, converting the received packets into packets modulated as predetermined with a second frequency, and transmitting the converted packets out to the plurality of terminal devices;

wherein each of the terminal devices is assigned a unique code for contention control and comprises monitor means for ORing bits of the code to be transmitted, and monitoring the accordance between bits of the OR and corresponding bits of the code to be transmitted in order to suspend the transmission if they do not accord.

2. The decentralized data-processing star network of claim 1, wherein the wireless transmission medium is one of infrared radiation and radio wave.

3. The decentralized data-processing star network of claim 1, wherein the predetermined modulation is ASK modulation.

4. The decentralized data-processing star network of claim 1, wherein the bit configuration of the unique code is one of all logical 0s, one logical 1 in the first bit, and more than one logical 1 contiguously from the first bit.

5. The decentralized data-processing star network of claim 1, wherein the bit configuration of the unique code is one of all logical 0s and only one logical 1 in any one bit.

6. A decentralized data-processing star network with a contention system, comprising a plurality of terminal devices and a concentrator to interconnect the terminal devices via a wireless transmission medium, any of the terminal devices being able to start to transmit a packet immediately after a pause disposed to prohibit all transmissions, the pause occurring every time a packet has been transmitted, wherein the concentrator comprises:

reception means for demodulating a packet modulated as predetermined with a first frequency, the packet being transmitted from the terminal devices via an upstream wireless transmission medium;

start bit generation means for counting the pause based on the demodulated packet and outputting a start bit for start-stop transmission, in accordance with the timing that the terminal devices should transmit their start bits;

OR means for ORing predetermined bits of the packet sent from the reception means with a start bit sent from the start bit generation means, and outputting the ORed bits; and transmission means for modulating the output of the OR means as determined with a second frequency different from the first frequency and transmitting the modulated output of the OR means to each terminal device via a downstream wireless transmission medium;

wherein each of the terminal devices is assigned a unique code for contention control and comprises:

transmission/reception means for modulating a packet to be transmitted as predetermined, with the first frequency, transmitting the packet to the concentrator via an upstream wireless transmission medium, and demodulating a packet received from the concentrator via a downstream wireless transmission medium, the received packet having been modulated by the second frequency;

packet OR means for ORing each bit of a packet to be transmitted with a corresponding bit of the packet demodulated by the transmission/reception means when the packet to be transmitted is transmitted to the concentrator; and communication process means for monitoring the accordance between the output of the packet OR means and the packet to be transmitted in order to suspend the transmission if they do not accord.

7. The decentralized data-processing star network of claim 6, wherein the transmission medium is one of infrared radiation and radio wave.

8. The decentralized data-processing star network of claim 6, wherein the predetermined modulation is ASK modulation.

9. The decentralized data-processing star network of claim 6, wherein the bit configuration of the unique code is one of all logical 0s, one logical 1 in the first bit, and more than one logical 1 contiguously from the first bit.

10. The decentralized data-processing star network of claim 6, wherein the bit configuration of the unique code is one of all logical 0s and only one logical 1 in any one bit.

11. The decentralized data-processing star network of claim 8, wherein the transmission medium is infrared radiation and the reception means has a plurality of reception ports to receive a packet from each terminal device, each of the reception ports comprises an optical-electric converter for converting infrared radiation into an electric signal and a demodulator to demodulate the packet outputted from the optical-electric converter.

12. The decentralized data-processing star network of claim 8, wherein the transmission medium is infrared radiation and the transmission means has a plurality of transmission ports to transmit packets to each terminal device, each of the transmission ports comprises a modulator to ASK modulate a packet to be transmitted according to each bit thereof and an electric-optical converter for converting electric signals into infrared radiation.

13. The decentralized data-processing star network of claim 6, wherein the start bit generation means comprises:

a timing detection unit for detecting a start bit in the packet demodulated by the reception means;

a timer unit for outputting a timeout signal by counting the pause, the timer unit is reset by the detection of the start bit; and a start bit transmission unit for outputting a start bit when the timer unit outputs the timeout signal.

14. The decentralized data-processing star network of claim 8, wherein the transmission medium is infrared radiation and the transmission/reception means has an optical-electric converter for converting infrared radiation into an electric signal, a demodulator to demodulate the packet outputted from the optical-electric converter, a modulator to ASK modulate the packet to be transmitted according to each bit thereof, and an electric-optical converter for converting an electric signal into infrared radiation.

15. A concentrator interconnecting a plurality of terminal devices via a wireless transmission medium in a decentralized data-processing star network, wherein any of the terminal devices can start to transmit a packet immediately after a pause disposed to prohibit all transmissions, the pause occurring every time a packet has been transmitted, the concentrator comprising:

reception means for demodulating a packet modulated as predetermined with a first frequency, the packet being transmitted from the terminal devices via an upstream wireless transmission medium;

start bit generation means for outputting a start bit for start-stop transmission, in accordance with the timing that the terminal devices should transmit their start bits, based on the demodulated packet;

OR means for ORing predetermined bits of the packet sent from the reception means with a start bit sent from the start bit generation means, and outputting the ORed bits; and transmission means for modulating the output of the OR means as predetermined with a second frequency different from the first frequency and transmitting the output of the OR means to each terminal device via a downstream wireless transmission medium.

16. The concentrator of claim 15, wherein the transmission medium is one of infrared radiation and radio wave.

17. The concentrator of claim 15, wherein the predetermined modulation is ASK modulation.

18. The concentrator of claim 17, wherein the transmission medium is infrared radiation and the reception means has a plurality of reception ports to receive a packet from each terminal devices, each of the reception ports comprises an optical-electric converter for converting infrared radiation into an electric signal and a demodulator to demodulate the packet outputted from the optical-electric converter.

19. The concentrator of claim 17, wherein the transmission medium is infrared radiation and the transmission means has a plurality of transmission ports to transmit packets to each terminal device, each of the transmission ports comprises a modulator to ASK modulate a packet to be transmitted according to each bit thereof and an electric-optical converter for converting electric signals into infrared radiation.

20. The concentrator of claim 15, wherein the start bit generation means comprising:

a timing detection unit for detecting a start bit in the packet demodulated by the reception means;

a timer unit for outputting a timeout signal by counting the pause, the timer unit is retriggerbly activated by the detection of the start bit; and a start bit transmission unit for outputting a start bit at the point of the timer unit outputting the timeout signal.

21. A wireless star network operating with a carrier sense multiple access/collision detection (CSMA/CD) contention system comprising:

a plurality of terminal devices;

wherein each terminal device is assigned a unique code for contention control and can start to transmit a packet immediately after a pause, the pause occurring after a packet has been transmitted, and each terminal device comprises:

transmission/reception means for modulating a packet to be transmitted with a first frequency, transmitting the packet to a concentrator via an upstream wireless transmission medium, and demodulating a packet received from the concentrator via a downstream wireless transmission medium, the received packet having been modulated by a second frequency;

packet OR means for ORing each bit of a packet to be transmitted with a corresponding bit of the packet demodulated by the transmission/reception means when the packet to be transmitted is transmitted to the concentrator; and communication process means for comparing the packet to be transmitted with the output of the packet OR means and suspending transmission if they do not correspond;

and a concentrator to interconnect the terminal devices via a wireless transmission media comprising:

reception means for demodulating packets modulated as predetermined with the first frequency, the packets being transmitted from the terminal devices via an upstream wireless transmission medium;

start bit generation means for counting the pause based on the demodulated packet and outputting a start bit for start-stop transmission, in accordance with the timing that the terminal devices should transmit their start bits;

OR means for ORing the start bit generated by the start bit generation means with the start bits of packets demodulated by the reception means, and outputting the ORed bits; and transmission means for modulating the output of the OR means as predetermined with the second frequency and transmitting the modulated output of the OR means to each terminal device via a downstream wireless transmission medium.

* * * * *